United States Patent [19]
Alster

[11] Patent Number: 4,563,040
[45] Date of Patent: Jan. 7, 1986

[54] FURNITURE ASSEMBLY

[76] Inventor: Ralph Alster, 1120 Belle Ave., Teaneck, N.J. 07666

[21] Appl. No.: 434,640

[22] Filed: Oct. 15, 1982

[51] Int. Cl.⁴ .......................... A47C 4/02; A47B 47/04
[52] U.S. Cl. .................................... 297/440; 108/153; 108/155; 108/156; 297/443; 312/265; 403/259
[58] Field of Search ............... 297/440, 443; 108/101, 108/111, 153–156; 312/263–265; 403/257, 259

[56] References Cited

U.S. PATENT DOCUMENTS

| | | | |
|---|---|---|---|
| 3,030,146 | 4/1926 | Faxon | 297/440 |
| 3,879,096 | 4/1975 | Blodee | 312/265 |
| 3,964,811 | 6/1976 | McClelland | 312/265 |
| 4,012,090 | 3/1977 | Pfeifer et al. | 312/263 X |
| 4,047,777 | 9/1977 | Pfeifer et al. | 312/263 |
| 4,226,488 | 10/1980 | Vincent | 312/264 X |
| 4,300,455 | 11/1981 | Ornati | 108/156 |
| 4,311,337 | 1/1982 | Brunn | 297/440 X |
| 4,318,576 | 3/1982 | Ford | 312/264 |
| 4,378,137 | 3/1983 | Gibson et al. | 312/263 X |
| 4,418,627 | 12/1983 | Baker | 108/153 X |

FOREIGN PATENT DOCUMENTS

1508585 4/1978 United Kingdom ............... 297/440

Primary Examiner—William E. Lyddane
Assistant Examiner—Peter R. Brown
Attorney, Agent, or Firm—Edward R. Weingram

[57] ABSTRACT

Articles of furniture are constructed of a unique rigid assembly of rods, rod caps, posts and rigid panels in an inter-locking relationship. A pair of rods nest in parallel coplanar grooves in top or top and bottom surfaces of the rigid panel, with the ends of the rods inserted into holes in supporting posts. Rod caps are threaded onto matching threaded ends of the rods to secure the rods to the posts. The rods are secured against disalignment from the matching grooves in the rigid panel and prevent rotation of the panel. The posts can be slotted to receive the panel to create the appearance of a smooth end. Various articles of furniture can be assembled from the component parts, including tables, chairs, chests, cabinets, etc.

15 Claims, 19 Drawing Figures

FURNITURE ASSEMBLY

BACKGROUND OF THE INVENTION

1. Field of the Invention

The present invention relates to furniture assemblies and particularly to an assembly of rods, caps, posts and panels providing a rigid furniture structure. More particularly, the the present invention relates to assemblys of tables, utility carts, cabinets, chests, desks, beds, self-supporting shelving, room dividers and multi-functional wall systems which may be assembled by the factory or by an end user using interlocking part-to-part joining of panels, posts, threaded rods and caps to provide a rigid furniture structure that does not entail the use of tools or conventional hardware fasteners, conventional part-to-part joining or adhesives.

2. Description of the Prior Art

Assembling most conventional factory furniture entails the use of a variety of hardware connectors, including nails, staples, screws, nuts, bolts, washers, brackets and tension rods, in combination with pinned, dowelled, wedged, splined, dovetailed, dadoed or braced part-to-part connections that are glued to secure their permanence.

Standard furniture practice for assembling legs to, for example, table tops calls for the use of steel or wooden angle brackets that are secured to a leg as well as to a pair of wooden rails that meet the leg at right angles. Sometimes the rails are dowelled and glued directly into the leg. These rails are in turn fastened to a top by means of screwed angles, glued and screwed wedges, or screws directly through the rails into the top, or by means of some combination of these techniques. The unsightliness of these connections requires that they be hidden from view. This is usually accomplished by using the rail, which is structurally connected to the leg, as a decorative skirt that wraps around and conceals all the unsightly connections from view. Where side or back panels are required in, for example, desks or chests, (either in lieu of legs or as a fill-in between leg framing elements) they are usually joined to each other, or to frames or tops, by means of screwed angle brackets or screwed and glued wedges. Since these connections are usually inside the desk or chest they are not seen, and thus no unusual effort is required to prevent their view. On the outside, veneers of plastic or wood, and various moldings, are used extensively to cover or disguise exterior joints and interstices between parts that are considered unattractive.

Further, conventional factory assembled furniture is generally designed for the performance of an exclusive furniture function that cannot generally be modified by the adding or taking away of accessory parts.

Still further, systems for knock-down assembly either in a factory or by an end user generally must deal with connective devices and techniques more discreetly and more selectively than is the case with conventional factory assembled furniture. This is because the objective of easy assembly as a primary consideration in knock-down furniture design encourages sparse, bare-boned structural solutions that aim at a minimum of parts and are largely devoid of cosmetically decorative elements that in conventional furniture serves to conceal or disguise the unsightly details of assembly. Accordingly, knock-down furniture systems tend to rely heavily upon connecting hardware devices that are designed for discreet concealment within the members to be joined. The members are provided with countersunk openings to receive fastening devices, which are generally comprised of screws, slots, nuts, bolts, steel rods and cams in various configurations. In some configurations the exterior ends of hardware linkages are left exposed in countersunk openings which may or may not be capped. In other configurations the hardware is almost entirely concealed within the interfacing surfaces of the parts joined.

Direct part-to-part joining techniques that do not require hardware are not generally incorporated in furniture systems that are designed for knock-down assembly. This is because conventional interlocking part-to-part joining techniques without hardware generally require the use of glue. Glueing techniques generally require clamping under controlled conditions to insure proper bonding.

Additionally, glued joints are not desirable for knock-down furniture because end users prefer knock-down systems that do not entail potentially messy and tricky glued connections. Nevertheless, while most conventional knock-down furniture assembly systems rely upon hardware fasteners and not interlocking part-to-part joining techniques, the achievement of a rigid and easily assembled interlocking part-to-part knock-down system requiring little or no hardware has been a goal of many designers and inventors, with various efforts in that direction being made.

One known assembly consists of combinations of tubular or rod-like framing members with various interconnecting corner members for the construction of three dimensional cubic frameworks. Since side, top and back panels are required for specific furniture functions, functional elements are generally clipped non-rigidly to the scaffold-like framework by means of accessory hardware devices. The application of part-to-part joining in these systems is limited only to the framework, which in terms of furniture function has none.

A consequence of the absence of rigid part-to-part interlocking between panels and framework in these systems is that a panel's contribution to the rigidity of a structure can be no greater than the strength of the device that clips it to the structure. Accordingly, these systems depend entirely on the integrity of their rod-to-corner piece joining for their rigidity. This means very extreme tolerance requirements in the manufacture of these parts. It also means that these parts require skilled installers for proper assembly and disassembly. Hence, even though these systems assemble and disassemble at the point of use, they cannot be properly termed knock-down systems, since that term implies assembly or disassembly by the the user.

Other efforts to obtain interlocking part-to-part knock-down assembly systems which require little if any hardware fasteners focus on the use of spindles and shelves to create vertical arrays of shelves, see for example, U.S. Pat. Nos. 3,831,533 and 4,099,472 to Kellog. In these systems the spindles extend vertically between shelves to hold them in spaced relationship to each other. It is common in these systems to provide the spindles with reciprocal male and female threaded ends, or to combine female threaded ends on the spindles with male threaded connectors, which when engaged through openings in a shelf will secure the shelf in a position between themselves. Since the part-to-part interlock of shelf to spindle is limited in such a system to the spindle ends, where the spindles act essentially as nut and bolt in sandwiching shelves between themselves, the spindles and shelves receive no mutual reinforcement from each other in resisting the system's susceptibility to torsion stresses that would make it twist and sway. Accordingly, the system's resistance to torsion forces is dependent entirely upon the rigidity of the spindles, which must be of considerable thickness as a consequence, and upon the tightness of the spindle-to-spindle and spindle-to-shelf interlock. Because these parts are usually made of materials that are dimensionally unstable in climatic changes, and very tight fits of spindle ends through shelf openings would impair ease of knock-down assembly, the parts cannot be manufactured to tolerances that are too exacting. Thus these systems exhibit a tendency to swing and sway to a degree that would not normally be tolerated in factory assembled furniture having a similar function.

Another prior art knock-down furniture assembly which utilizes a minimum of hardware fasteners is described in U.S. Pat. No. 3,570,418 to Gooding et al. This assembly includes two vertical side supports having slots for receiving tongues at the ends of transverse boards, and holes for receiving dowel screws which fit into the ends of support rails. The rails are secured to the side supports by knobs fastened onto the outer ends of the dowel screws. Gooding et al utilizes the spindle/shelf structure turned on its side so that what were shelves in the Kellog systems are now functional as vertical supports, and what were vertical spindles in the in the Kellog systems now serve as horizontal spacing members between those supports. Since what were horizontal shelves in the Kellog systems have now been transformed into vertical supports, a new element is introduced to function as a horizontal surface. While this horizontal surface is parallel to the spindles that hold the array together, it is not interlocked with the spindles in any manner for strengthening the system's resistance to loading forces that would cause it to sway and bend out of square alignment as a result of any weakness or looseness in the interlock between the spindles and caps that sandwich the vertical supports in nut and bolt fashion. This critical linkage is recognized as a potential weak point in the Gooding et al system, and Gooding et al introduces washers to assist in obtaining a tight cap vertical support/spindle sandwich. The horizontal panel, is linked to the vertical supports by means of tabs that extend from its ends through slots in the vertical supports. This loose linkage, however, is not locked in any way for the purpose of strengthening the system's rigidity, and serves simply to hang the horizontal member in place.

Another modification in Gooding et al and to Kellog relates to the threaded interlock between spindles and caps. Both spindle ends are fitted with female threading. An additional part in the form of a male threaded dowel is required to make the spindle-to-cap interlock. The introduction of this third part in the interlock configuration contributes to problems in tightening the interlock and maintaining its rigidity, the problematical nature of which is attested to by the need for washers, since spindle and cap are each now fitted to an intermediate part instead of directly to each other.

In further recognition of this rigidity problem Gooding et al requires that at least three spindles be used to secure the vertical supports for adequate rigidity. These spindles must be spaced in a vertical direction as well as laterally. As a consequence the third spindle, in its location at midpoint between the top and bottom of the vertical supports, is potentially a functional encumbrance in some applications of the system, as for instance, in desk or table configurations.

Nevertheless, with regard to function, this system seems to describe some advantages over the previously discussed Kellog vertical spindle arrays. Kellog does not describe functional modification. Kellog makes no provision for the insertion of side or rear panels between a pair of shelves for transformation of an open segment into a chest or cabinet. On the other hand, the horizontal spindle array does describe some functional modification. This modification, however, cannot be achieved by the addition or substraction of parts that will transform a given unit from one functional role to another. The total replacement of discreet functional subassemblies is required to achieve modification of function.

The use of horizontal rods or rails fitting into recesses and holes in vertical legs to form a chair is also known, as shown in U.S. Pat. No. 233,478 to Creager. In this case, the front legs and seat are preassembled and the rear legs and back connected permanently. A rear rail is beveled at each end to fit snugly into angular recesses in the back to support the seat. Side rails include shoulders and projections at the rear ends to fit into holes in the back and to be flush with the back when secured. The projections are split and the ends for the insertion of wedges which fit into countersunk apertures to hold the assembly together.

These known structures, however, are not sufficiently rigid and the elements tend to move out of alignment and become displaced and unsteady.

Of additional interest are the following U.S. Patents:
U.S. Pat. No. Des. 27,227 to Zinn;
U.S. Pat. No. 115,456 to Fisher;
U.S. Pat. No. Des. 252,719 to Otero;
U.S. Pat. No. 719,837 to Morton;
U.S. Pat. No. 3,097,615 to Ross;
U.S. Pat. No. 3,131,970 to McGregor;
U.S. Pat. No. 3,743,353 to Lupinsky;
U.S. Pat. No. 3,880,095 to Clark et al; and
U.S. Pat. No. 4,261,667 to Ervin et al.

SUMMARY OF THE INVENTION

The present invention provides a furniture assembly with a unique configuration of rods, rod caps, posts and rigid panels that are assembled in an interlocking relationionship. A rigid panel includes parallel coplanar channels in top and bottom surfaces which accommodate a pair of rods. In another embodiment the panel includes a channel on only one surface and the rods are adapted to be non-rotatably received therein. The ends of the rods are inserted into matching holes in supporting posts and threaded and secured to the posts by rod caps having matching threads. The rods nesting in the channels on opposite surfaces of the rigid panel and secured to the posts provide a clamping action which prevents disalignment and rotation of the panel with respect to the other elements. Use of slots in the posts to receive the panel can provide a flush appearance and added strength.

It is an object of the present invention to provide a rigid furniture structure formed of an assembly of basic elements.

Another object of the invention is to provide a furniture assembly having elements that are rigidly secured together to prevent disalignment, rolling and rotation of the various parts of the assembly.

A further object of the invention is to provide a furniture assembly of interlocking rods, rod caps, posts and panels that can be rigidly secured together without added fastening devices such as screws, nails, bolts, adhesive materials or hidden devices that are not integral with the elements to be joined.

Another object is to provide an easily assembled and disassembled system for the construction of tables, utility carts, cabinets, chests, beds, desks, self-supporting shelving units, room dividers and multi-functional wall systems.

Another object is to provide a furniture assembly system wherein the use of conventional hardware fasteners, conventional part-to-part furniture joinery, adhesives or conventional knock-down hardware fasteners are absent.

A still further object is to provide a furniture assembly system wherein the assembler need not have furniture construction skills, and wherein tools are not required in the process of assembly.

Still another object of this invention is to provide a furniture assembly system wherein the parts to be joined provide the means of joining.

Yet another object is to provide a furniture assembly system wherein the parts to be joined interlock with each other in the creation of structures that are at least as rigid and as permanent as those obtainable by conventional in-the-factory construction and assembly, and superior in rigidity and permanence to those obtainable by conventional knock-down furniture structuring and assembly techniques.

Another object is to provide a furniture assembly system wherein the parts interlock to offer mutual reinforcement to each other, thereby strengthening the rigidity of the structure.

Yet another object is to provide a furniture assembly system wherein the method of joining parts does not entail unattractive details that require decorative concealment.

Still another object is to provide a furniture assembly system wherein a table is the basic structural module of the system.

Another object is to provide a furniture assembly system wherein the table can be transformed into a cart, chest, cabinet or desk by means of the addition of standardized base units in combination with back panels and side panels with hinged doors or side panels with drawers.

Still another object is to provide a furniture assembly system wherein the installation of said accessories for the transformation of a table into a cart, chest, cabinet or desk is accomplished without the aid of hardware, adhesives or tools and wherein the installer need not have furniture construction skills.

Yet another object is to provide a furniture assembly system wherein tables are the basic structural modules, and chests or cabinets derived therefrom, can be combined in various stacking or side-by-side configurations for the creation of desks, bookcases, room dividers or multifunctional wall systems.

Other objects and advantages will be apparent from the following description of the invention; the novel features being particularly pointed out hereinafter in the claims.

DESCRIPTION OF A PREFERRED EMBODIMENT OF THE INVENTION

Figure 1:
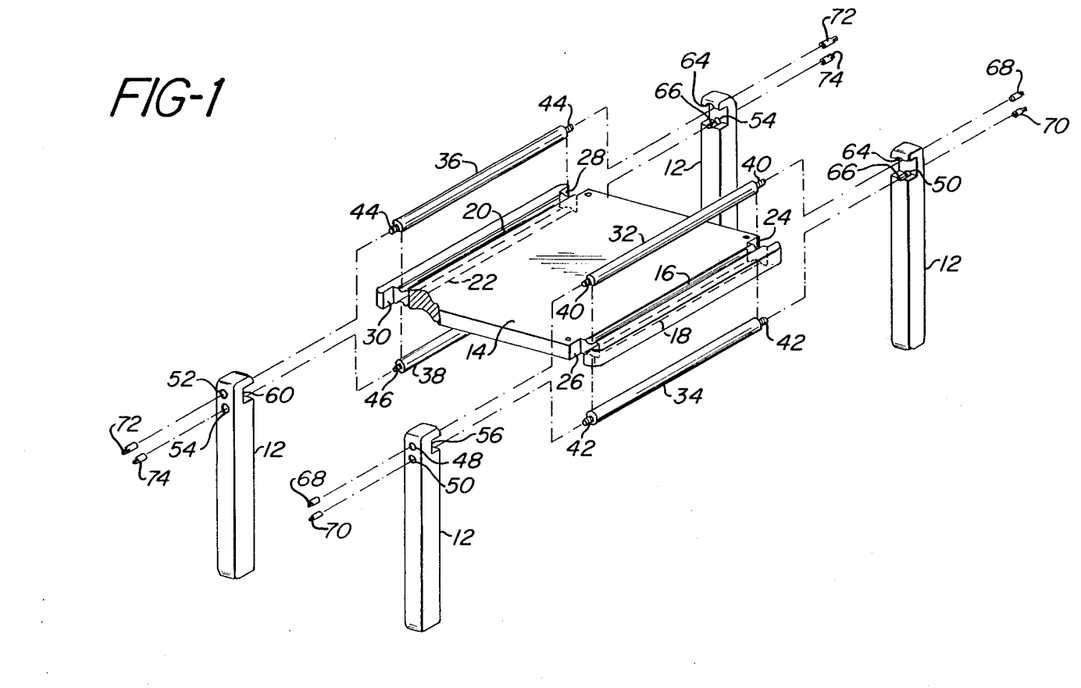
FIG. 1 is an isometric view of various separate elements of a table constructed in accordance with the present invention.
Figure 2:
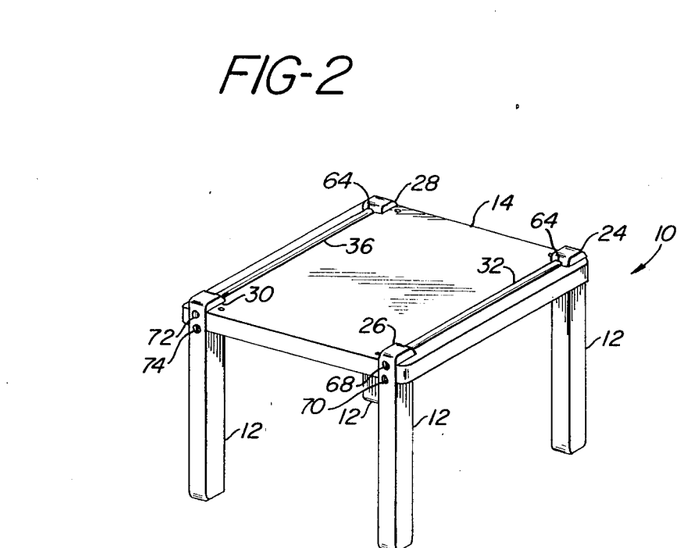
FIG. 2 is an isometric view of the table constructed from the assembled elements of FIG. 1.

As shown in FIGS. 1 and 2, a table 10 is formed of four vertical posts or legs 12 and a flat rigid top 14. Two opposite ends of the table top have respective pairs of coplanar parallel grooves 16, 18, 20, 22 along the upper and lower surfaces spaced from the edges. Notches 24, 26, 28, 30 are cut into the other edges of the table top at the ends of each pair of grooves. Pairs of rods 32, 34, 36, 38 are positioned above and below the table top to be received in respective grooves. The rods include smaller diameter threaded ends 40, 42, 44, 46. The upper ends of each leg include pairs of holes 48, 50, 52, 54 and notches 56, 58, 60, 62 in the inner sides. The holes are in the walls behind the notches and the upper and lower surfaces of all the leg notches include grooves 64, 66 to receive the ends of the rods. Pairs of internally threaded rod caps 68, 70, 72, 74 are positioned adjacent the holes in the legs and are countersunk or recessed into the legs.

Upon assembly of the elements, a first leg is positioned so that the upper notch engages a matching notch in the edge of the table top. A first rod is then placed in a respective groove in the table top with a threaded end passing through the leg notch and groove and inserted into an aligned hole in the leg so that the end extends through the leg and outwardly from the other side of the hole. A rod cap is then threaded onto the extending rod end to secure the rod to the leg. This procedure is repeated for the other rod of one pair to secure upper and lower rods in respective table grooves and holes in one leg. The opposite ends of the rods are then inserted into like holes in the notch of a second leg which is secured by caps to the other end of the table. A second pair of legs and rods are then secured in a like manner to the other side of the table until all four legs are in position and the assembly is complete. The nesting of the pairs of rods in parallel grooves in a common vertical plane in the upper and lower surfaces adjacent the ends of the table provides a rigid clamping action to hold the table securely between the rods which are fastened to the legs. This rigid connection and interlocking of elements prevents disalignment and rotation of the table panel.

Figure 3:
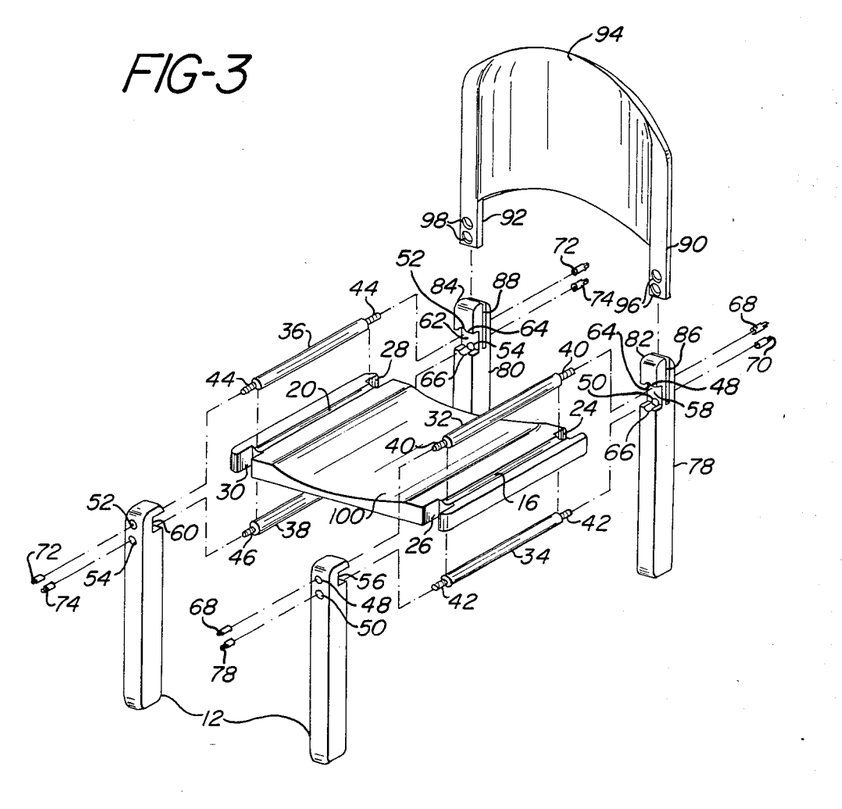
FIG. 3 is a view of various elements of a chair made in accordance with the present invention.
Figure 4:
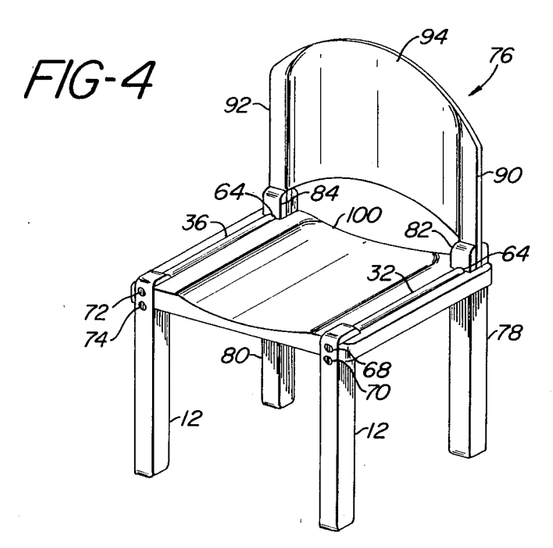
FIG. 4 is a view of the chair made from the assembled elements of FIG. 3.

FIGS. 3 and 4 show a similar arrangement of elements which are assembled to form a chair 76. The same numbers are used to designate like member elements. The front legs or posts 12 include upper notches 56, 60 with holes 48, 50, 52, 54 while the rear legs 78, 80 include upper notches 58, 62 with holes 48, 50, 52, 54 and grooves 64, 66 which are also present in the front legs. The rear legs include added rounded vertical extensions 82, 84 and vertical slots 86, 88 to receive and support vertical posts 90, 92 at opposite sides of the back 94 of the chair. The posts also include pairs of holes 96, 98. The chair seat 100 has a curved upper surface and two pairs of longitudinal grooves 16, 18, 20, 22 adjacent opposite sides of the upper and lower surfaces. Pairs of notches 24, 26, 28, 30 are located at the opposite ends of the grooves. Pairs of rods 32, 34, 36, 38 are disposed above and below the seat 100 to be received in respective longitudinal grooves with smaller diameter threaded rod ends 40, 42, 44, 46 for insertion into holes in the legs. Pairs of internally threaded rod caps 68, 70, 72, 74 are positioned to engage the threaded rod ends.

The chair is assembled in a like manner to that of the table, with the front leg notch positioned to engage the front seat notch. The upper and lower rods are placed in the upper and lower longitudinal seat grooves with ends inserted through the two aligned holes in the front leg and rod caps threaded onto the rod ends to secure the rods to the leg. The front leg on the opposite side likewise engages the other front seat notch and the respective rods are secured to the other front leg by the rod caps. The two back legs are first assembled with the back support posts which engage the vertical slots in the legs. The holes in the back posts are aligned with holes in the back legs and then positioned to engage the threaded rod ends. The rod caps are then fastened to the rod ends extending through each of the back legs in turn to secure the chair back and back legs to the chair seat. The arrangement of rods in upper and lower grooves in the seat again provides a clamping action to rigidly secure the seat and back to the legs to minimize disalignment and rotation of the members.

Figure 5:
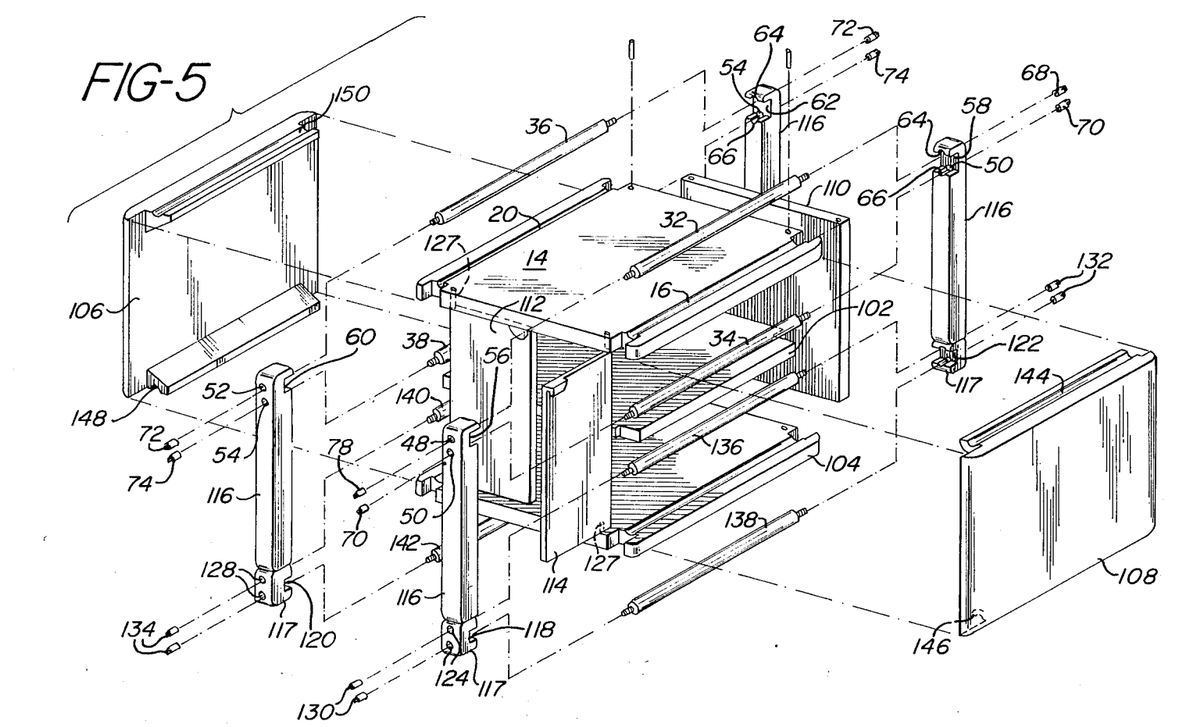
FIG. 5 is a view of various elements of a cabinet made in accordance with the invention.
Figure 6:
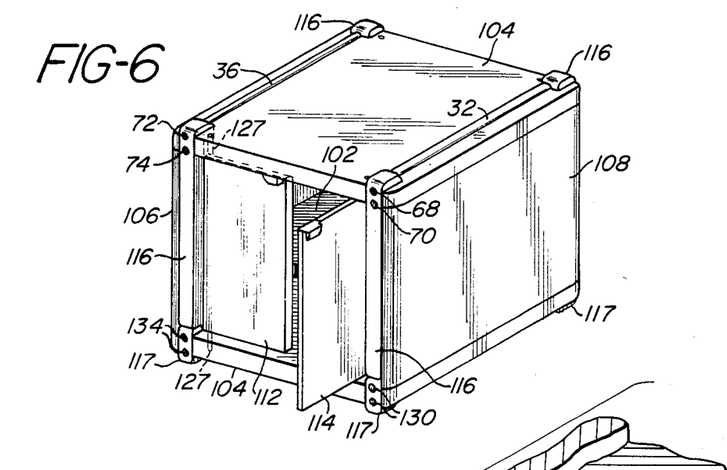
FIG. 6 is a view of the cabinet made from the assembled elements of FIG. 5.
Figure 7:
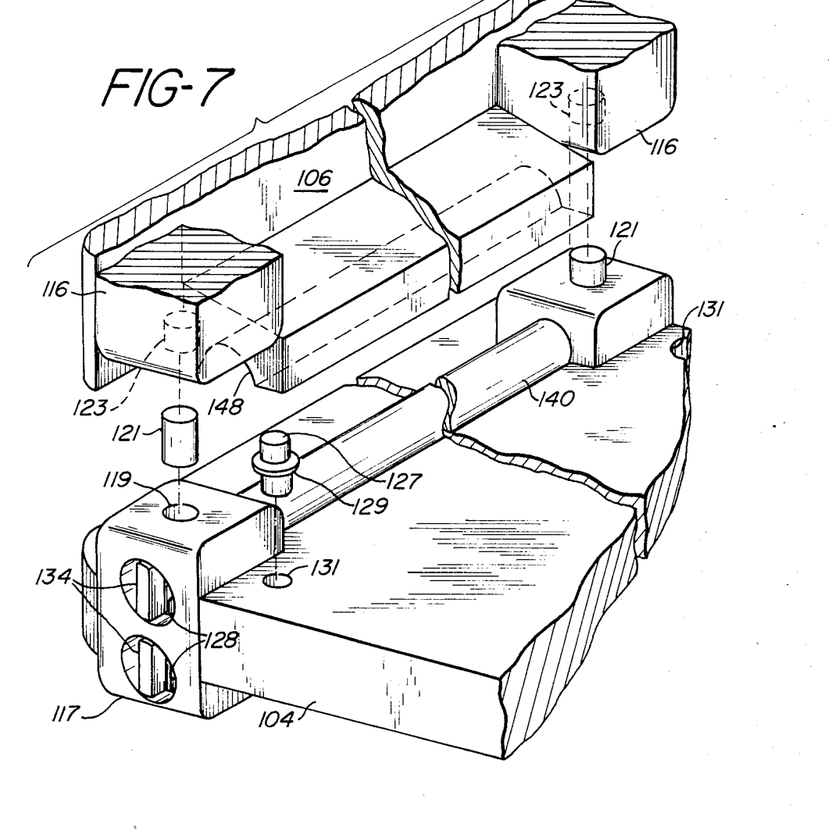
FIG. 7 a view of the various elements of the lower left corner of the cabinet in FIG. 6.

FIGS. 5, 6, and 7 show another like assembly of elements forming a cabinet. The basic structure includes many of the table members with same numbers of FIGS. 1 and 2, with addition of a middle shelf 102, a notched grooved bottom shelf 104, side panels 106, 108, a rear panel 110, and pivoted front doors 112, 114 with handles 115.

As shown more clearly in FIGS. 5 and 7, the four legs 116 are supported on member 117 having lower notches 118, 120, 122, and one not shown, added pairs of holes 124, 126, 128 with one pair not shown, added rod caps 130, 132, 134 and one not shown, and added pairs of rods 136, 138, 140, 142.

Referring to FIG. 7, each member 117 is provided with a hole 119 on the top thereof, mating dowel 121 and mating hole 123 in leg 116 to securely attach member 117 to leg 116 to provide a secure support member. The holes at bottom of 116 or 117 may also be used to retain casters (not shown).

The side panels include upper and lower grooved inner lateral extensions 144, 146, 148, 150, which, as shown in FIG. 7 more clearly, mates with rods 136, 138, 140 and 142. Hinge pin 127 having locating washer 129 is inserted in front hole 131 to carry door 112 and 114. Rear panel 110 is supported on pins (not shown) inserted in rear holes 131.

The various elements are again assembled like those of the previous configurations. Preferably, lower shelf 104 is first assembled to all four members 117. Upper shelf 14 is assembled to all four legs 116. Side panels 106, 108 back panel 110 and doors 112, 114 are located in position on lower rods 136, 140 or in the case of side panels 106, 108 on lower pins. Assembled upper shelf is then eased into position so that holes 123, 119 and pins 121 align and fix upper and lower tables in position with all side panel grooved lateral extensions aligned to rods and all pins aligned to holes in doors and back panels and holes 131 in upper and surface of bottom shelf and lower surface of upper shelf.

Optionally, the lower shelf is joined to member 117 with the engagement of respective lower notches. Member 117 is then joined to the front legs. The lower pairs of rods engage the grooves in opposite surfaces of the lower shelf with the rod ends passing through the lower pairs of holes in each member 117 and the lower pairs of rod caps securing the lower pair of rod ends to the member 117. The upper table member is than partially and loosely secured to the upper front legs by engaging the table and leg notches. The upper rod members of the upper pairs are inserted in the upper surface grooves with the ends passing through the upper holes of each upper front pair and secured to the front legs by the upper rod caps of each upper front pair of caps. The side panels are then assembled by positioning the lower grooved inner lateral extensions over the upper rod of each lower pair of rods to engage the rod in the groove of the panel extension. The upper grooved lateral extension is than aligned with the lower surface groove of the table top and the lower rod of the upper pair is inserted into the cylindrical space between the two grooves. The lower rod caps of the upper front pairs then secure the ends of the lower rods of the upper pairs to the front legs to hold the side panels in position between the lower rods of the upper pairs and upper rods of the lower pairs. The middle shelf and back panel are placed in the desired positions and secured in a suitable manner. The back leg notches are then positioned to engage respective upper table and lower shelf notches with the rod ends of upper and lower pairs passing through respective holes in the back legs. Pairs of rod caps then secure the rod ends to the upper and lower portions of the back legs to complete the assembly and provide a rigid clamping action of the various elements. The front door may be pivotably secured between the table top and the bottom shelf by means of suitable pins and holes 127, 129 and 131.

Figure 18:
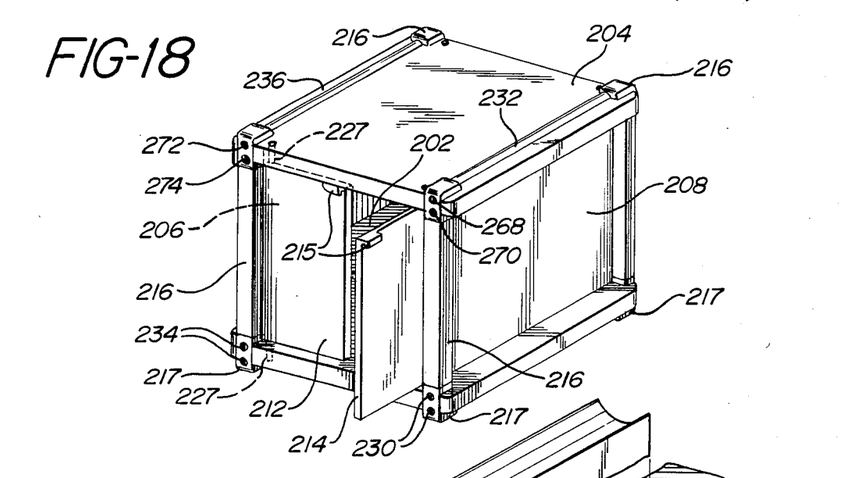
FIG. 18 is another embodiment of a cabinet made in accordance with the invention.
Figure 19:
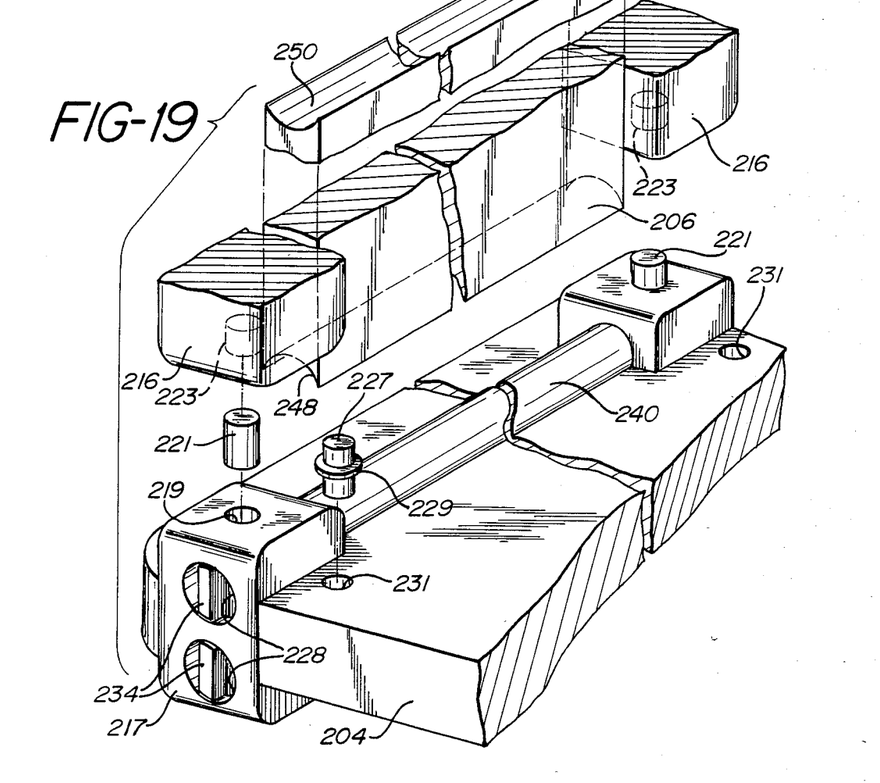
FIG. 19 is a view of various elements of the lower left corner of the cabinet shown in FIG. 18.

FIGS. 18 and 19 show another embodiment of a cabinet and/or shelf which is similar in nature to that shown in FIGS. 5, 6, and 7. The difference in this embodiment relates to the fact that the base portion and the upper horizontal surface coact to hold the side panels in position. The base portion analogous to the previous embodiment is formed from four corner members 217 and a horizontal member 204 which is secured to the corner members by means of pairs of rods 240 at the upper and lower surface on opposing sides of the base portion 204. The rods are secured to the end pieces 217 by means of nuts 234 screwed on to the ends of the rods and in recesses 228 formed in the corner pieces 217. The upper horizontal surface 204 is held by means of four vertical legs 216 having in effect corner pieces at the upper ends with recesses for the nuts to be housed. The nuts coact with the rods 236 and 232 on either side of the upper horizontal piece 204 to secure the horizontal member to the legs. In effect this upper portion is very similar to the construction of the simple table shown in FIGS. 1 and 2. The side panels 206 are held in place by means of grooves 248 at the lower end and 250 at the other end which will mate with the upper surface of rods 240, 238 and 234 (not shown) which are the lower rods holding the upper surface 204. The sides of side boards 206 is such that there will be close dimensional similarity between the distance from the lower vertical surface 204 to the upper vertical surface so that the mating fit between the grooves on the side board and the exposed portions of the rod will be sufficient to prevent any horizontal movement perpendicular to the plane of the side board 206. The movement of the side board parallel to its plane is prevented by the dimensional compatability of the side board to the distance between the adjacent legs 216. The bottoms of the legs 216 are secured to the corner pieces 217 by means of pins 221 which fit into recesses 223 in the bottoms of the legs and recesses 219 in the top of the corner pieces. The cabinet shown in FIG. 18 can have shelves installed in it quite easily by merely mounting shelf holders or slides (not shown) to the side board 206. Doors 212 and 214 would be mounted in the manner as previously described in connection with FIGS. 5, 6 and 7. It should also be pointed out, that while FIG. 18 shows a single tier cabinet, it is possible to have multiple stacks of cabinets to form a chest or bureau merely by placing bores into the top of legs 216 so that additional legs could be attached by means of pins 221 in the manner shown in FIG. 19. Therefore, it is possible to stack several layers or tiers of drawers or cabinets to form a single unit.

Figure 8:
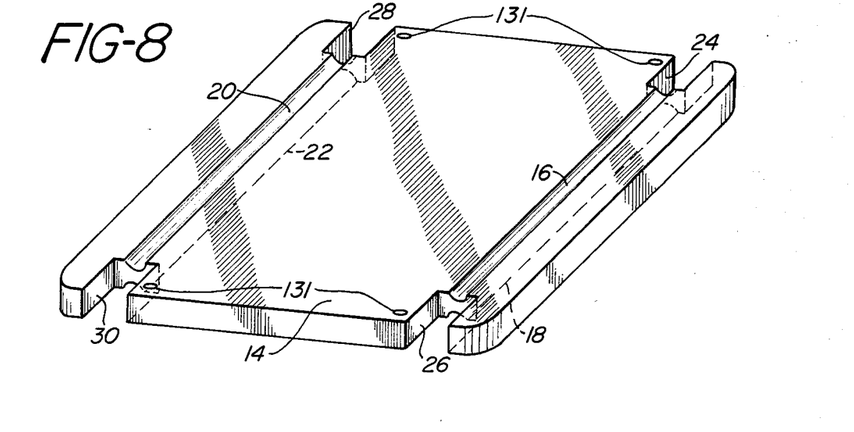
FIG. 8 view of a rigid panel element of this invention.

FIG. 8 is a detailed view of a rigid panel 14 which may be utilized as an element of invention, e.g. a top or bottom panel. The rigid panel 14 includes a pair of parallel coplanar channels 16, 18, 20, and 22 at each end. These specific panels depicted in FIG. 8 may be used in the assembly depicted in FIGS. 5-7 and thus include holes 131 for hinges to carry doors 112 and 114 and back panel 110.

Figure 9:
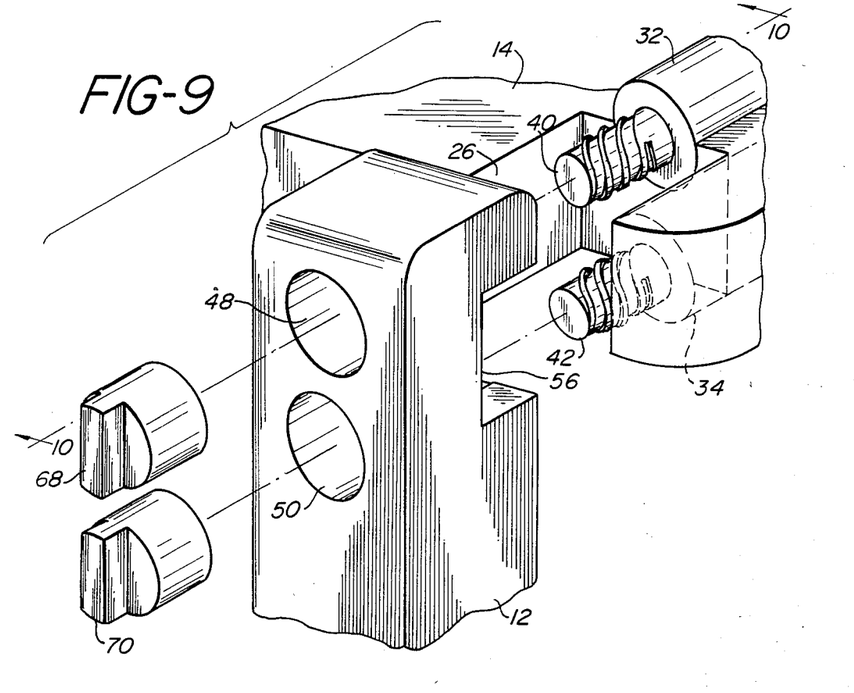
FIG. 9 is a detailed view of the elements of the securing means of this invention.
Figure 10:
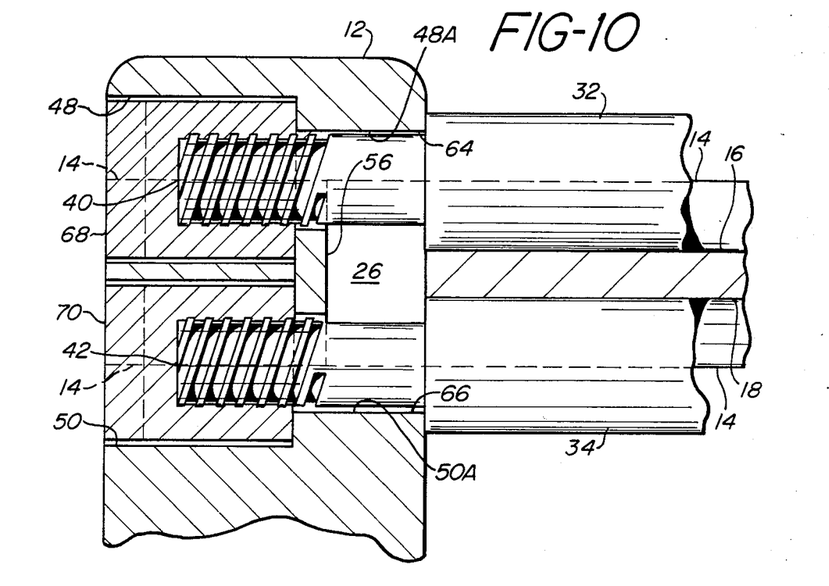
FIG. 10 is a cross-sectional view of the assembled securing means of this invention taken along line 10—10 of FIG. 9.

FIGS. 9 and 10 are detailed views of the elements of the securing means of this invention depicting rods 32 and 34 including smaller diameter threaded ends 40 and 42. The upper ends of each leg 12 includes a pair of holes 48 and 50 which are the same diameter as the rod caps 68, 70 and further include inner holes 48A and 50A of the same diameter as the rod ends 40, 42, and notch 56 in the inner side. A pair of internally threaded rod caps 68 and 70 are positioned adjacent the holes in the legs.

Figures 11, 12:
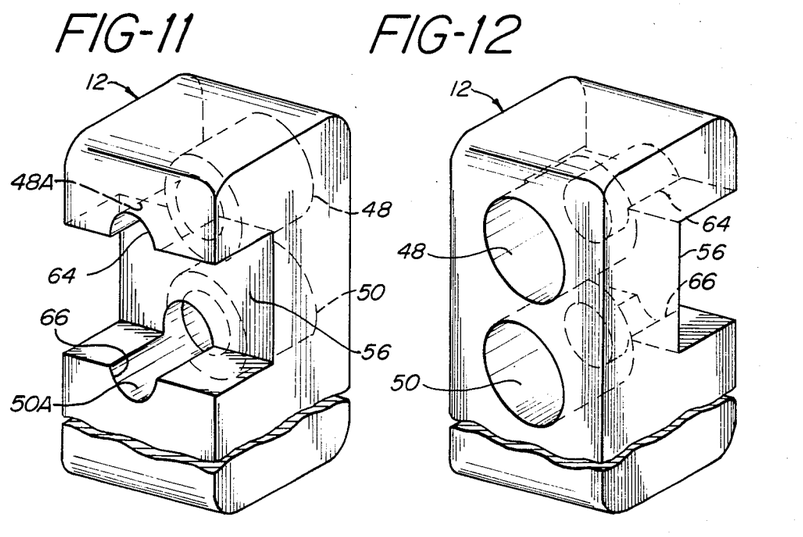
FIG. 11 is a view of an upper end of a support member.
FIG. 12 another view of the upper end of a support member of FIG. 11.

FIGS. 11 and 12 are views of an upper end of a support leg 12 (116, 117) depicting a pair of holes 48, 50 and 48A and 40A and notch 56 therein.

Figures 13, 14:
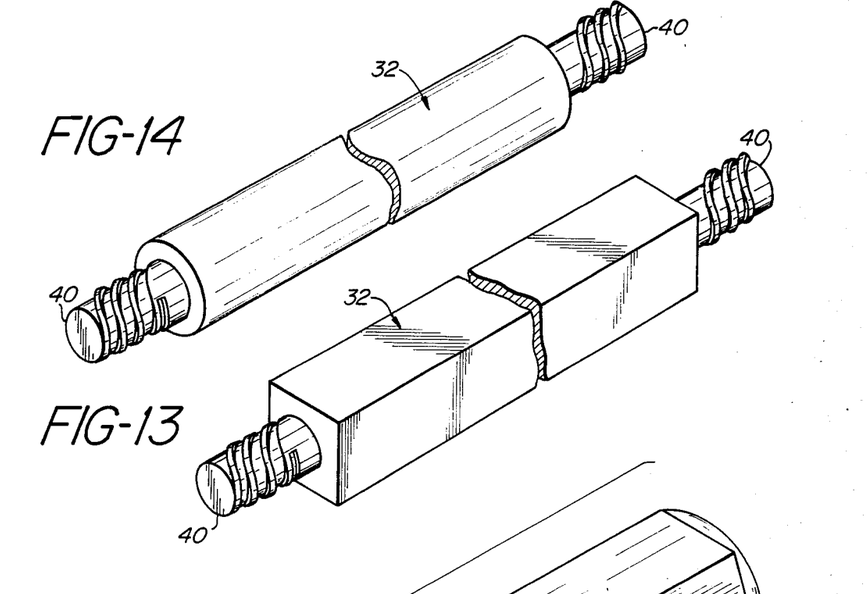
FIG. 13 a view of one embodiment of an elongated rod element of this invention.
FIG. 14 is another embodiment of an elongated rod element of this invention.
Figure 17:
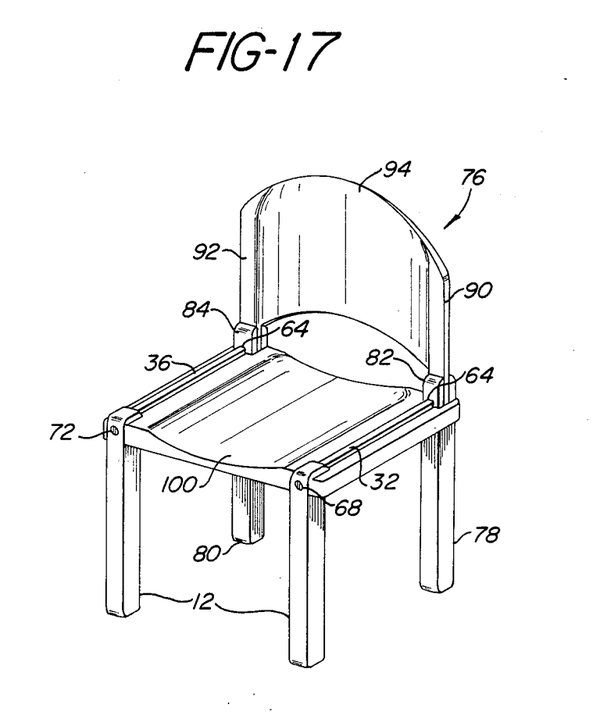
FIG. 17 is another embodiment of the chair of FIG. 4.

FIGS. 13 and 14 depict two embodiments of the rod 32 which may be utilized herein. The rod depicted in FIG. 13 is used for non-rotatably mating with a channel in a flat rigid top whereas the rod depicted in FIG. 14 is the one utilized in the embodiments depicted in FIGS. 1-7, and 9-10. The rod depicted in FIG. 13 is utilized in a furniture assembly similar to that depicted in FIG. 17, wherein there is only one rod utilized which is non-rotatably received in respective channels at the opposite ends of the panel. In FIGS. 13 and 17 the rod is substantially square and non-rotatably fits into a mating channel. The elements in FIG. 17 form a chair. The front legs or posts 12 include upper notches with a single hole therein while the rear legs 78 and 80 include upper notches with single holes therein. A single groove 64 is also present in the front and rear legs. The rear legs include added rounded vertical extensions 82 and 84 and vertical slots 86 and 88 to receive and support vertical posts 90, 92 at opposite sides of the back 94 of the chair. The posts also include a single hole 96 and 98. The chair seat 100 has a curved upper surface and a longitudal groove 16 and 20 at opposite sides of the upper surface. Pairs of notches 24, 26, 28, and 30 are located at the opposite ends of the grooves. A rod 32 & 36 is disposed above the seat 100 to be received nonrotatably in respective longitudinal grooves with smaller diameter threaded rod end 40 and 44 for insertion into holes in the legs. Internally threaded rod cap 68 and 72 are positioned to engage the threaded rod ends. The chair is assembled in a like manner to that of the chair depicted in FIGS. 3 and 4.

Figures 15, 16:
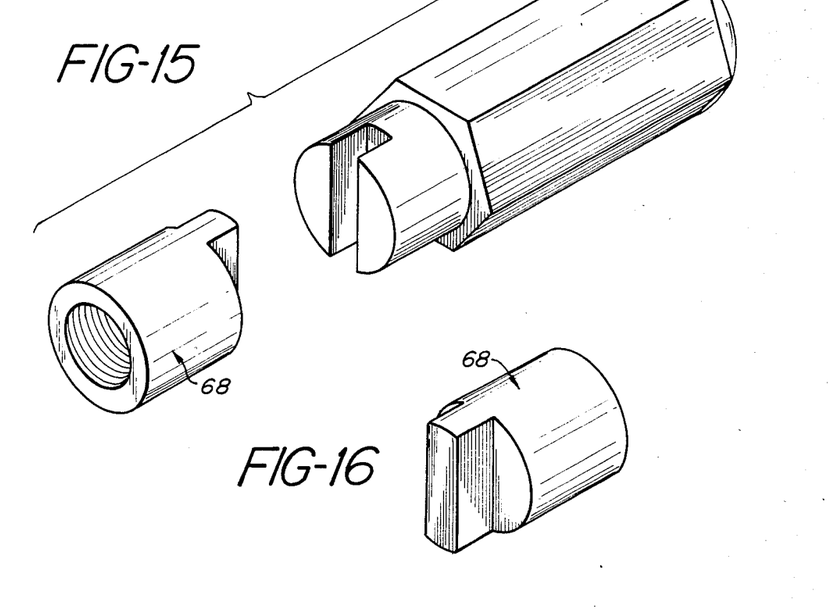
FIG. 15 a view of a rod cap element used in this invention and a tool which may be utilized to turn such cap.
FIG. 16 is another view of the rod cap element of FIG. 15.

Additionally, the caps utilized in this invention (FIGS. 15 and 16) may be tightened or loosened with the tool depicted in FIG. 15 which comprises an elongated member having a mating end to the top of the cap.

The aforedescribed invention provides for the joining of vertical and horizontal members in tight configurations by means of nesting threaded rods into panels and securing them with threaded caps. The rods nest into grooves provided for them in the panels, and their threaded ends penetrate through passages in the vertical members. If the rods are of circular section they nest into grooves of matching diameter that are preferably one half the rods' diameter in depth. If they are of rectangular or triangular section they nest into grooves of identical section, to either partial or full depth.

Each of the rods is comprised of a body segment and externally threaded ends that are of a diameter that is narrower than the body. When the threaded rod ends are passed through openings of identical diameter in a pair of panels or legs, the rod will hold the panels or legs in spaced relation against the shoulders that define the transition from the larger radius of the rod's body to the narrower radii of its ends. When internally threaded caps are threaded onto the rod ends that project through the openings in the legs or vertical panels, these caps will clamp said legs or vertical panels between themselves and the rod's shoulders and will prevent them from sliding off the rod ends.

The nesting of said rods in grooves in the horizontal panels prevents panels so interlocked with rods from sliding or rolling laterally vis-a-vis said vertical panels or legs that are held in spaced relation by the rods, or from rotating out of horizontal alignment. At the same time the horizontal panels into which the rods nest reinforce the rods along their length by resisting any bending of the rods that would allow spaced verticals to toe in or out of their parallelism to each other. Finally, nesting of the rods into the horizontal panels integrates them visually and functionally with the panel in assembled furniture configurations. When the horizontal panel functions as an open shelf the nested rods provide barriers at the shelf's ends. When the horizontal panel functions as an enclosed shelf, the projecting portions of nested rods function as retaining ridges onto which the edges of vertical enclosing panels are nested for fixed positioning.

Rods may be nested in parallel coplanar pairs into the top and bottom surfaces of a panel, or individually into either the top or bottom surface of the panel. When a single rod is nested into the top or bottom surface only, the legs or vertical panels that are held in spaced relation by the rod so nested must have ledges aligned to the side of the horizontal panel that is opposite the side on which the rod is nested. In this configuration, a nested rod that has had its ends restrained by slotting them through matching openings in vertical supports at both ends, will clamp the horizontal panel against the ledge. A horizontal panel so clamped is restrained by the nested rod from sliding or rolling laterally vis-a-vis its vertical supports, and from rotating out of the horizontal in one direction vis-a-vis those supports and from tilting in the other. The vertical supports are prevented from rotating around the rod by the rod's firm clamped positioning of the panel onto aligning ledges on the vertical supports. Finally, the parallelism of legs on opposite ends of a rod, as established by the rod's resistance to bending, is guarded by the resistance the panel offers to bending in a rod nested into it. When female threaded caps are threaded onto the male threaded rod ends they prevent any lateral displacement in the direction of the rod's length of this rigid interlocking structural configuration.

When a pair of rods are nested into parallel coplanar grooves on top and bottom surfaces of a horizontal panel, the vertical members that are held in spaced relation on opposite ends of the rods need have no ledges. In this configuration, a pair of nested rods that have had their ends passed through pairs of passages in vertical supports at both ends will clamp the horizontal panel between themselves. A horizontal panel so clamped is restrained by the nesting rods from sliding or rolling laterally vis-a-vis its vertical supports, and from rotating out of the horizontal vis-a-vis those supports in one direction, and from tilting in the other. The vertical supports so linked by pairs of rods that are restrained at their ends by the supports cannot rotate around either rod because of the restraint offered by the second rod. By withstanding bending of the rods, the panel into which the rods nest reinforces their resistance to toe-in and toe-out violations of parallelism between the vertical supports. Caps threaded onto the rod ends prevent lateral displacement of the array along the rods' length. These caps are countersunk into the vertical members in order to reduce their projection from the face of said supports.

While horizontal panels and vertical legs may have interlocking notches that contribute to strength of a structural assembly, these are provided (for aesthetic reasons) in order to establish flushness between horizontal panel edges and vertical leg faces. The contribution of these interlocking notches to the rod-to-panel, rod-to-vertical support structural configuration is coincidental and non-essential to its successful accomplishment.

Tables are the basic functional modules that derive from the furniture structuring and assembly system described above. When two tables are stacked one upon the other the resultant upper and lower horizontal surfaces, together with the vertical supports that hold them in spaced array, define a framework for cabinetry, utility carts, desks or beds. The lower table may have stub legs, if it is intended to serve essentially as a base for the cabinet. The height of the cabinet will be determined by the height of the table legs. Its width will be determined by the width of the horizontal panels. The framework can be enlarged to perform wall system or room divider functions by stacking additional tables onto the original pair and by arranging stacks so constructed alongside each other.

A framework is transformed into a cabinet by the enclosure of the openings defined by its horizontal panels and vertical supports. Side panels are securely nested in place, as aforesaid, by the alignment of slots in their top and bottom edges onto the projected profiles of rods that are nested into the top and bottom panels of an array. When a single rod to panel configuration is used, the lower edge of the side panel nests onto the projected profile of a rod that is nested into the upper surface of the bottom panel. The upper edge of the side panel is held in place by means of a tongue that projects therefrom for nesting into a matching groove in the lower surface of the top panel. Rear panels are secured in place by means of pins in their top and bottom edges that are received by reciprocal holes in the top and bottom panels. The resultant cabinet configuration has three closed sides. The open ends can be outfitted with shelves, doors, drawers, or combinations of these. The side panels are fitted with slots that can receive shelf-support pegs, doormounting hinges or drawer mounting glides. The solidly handsome cabinets so constructed assemble in a matter of minutes. Hardware, tools or adhesives are not involved in the process of assembly described above. These cabinets can be combined in various side-by-side and stacking arrangements for the creation of an endless variety of wall system and room divider configurations.

While several embodiments of the invention have been illustrated and described, it is apparent that many other variations may be made in the particular design and configuration without departing from the scope of the invention as set forth in the appended claims.

What is claimed is:

1. A furniture assembly comprising:
    an elongated rigid panel;
    securing means at opposite ends of the panel, the securing means including at least one coplanar channel extending along two opposite ends of the panel and a pair of notches at respective opposite ends of the channels;
    elongated rods adapted to be received and rigidly supported in respective channels at the opposite ends of the panel;
    a plurality of support members spaced about the edges of and abutting the panel, in alignment with the ends of said elongated rods, each support member including a hole at the upper ends of the member and adapted to receive the end of the respective rod, and a matching notch in an inner surface at the ends adjacent the holes engageable with respective notches at the channel ends; and means for releasably fastening the opposing ends of the rods to the respective support member to rigidly secure the panel between the rods and to the support members, the rods, channels and matching notches coacting with the panel and support members to prevent rolling and rotation of the panel member with respect to the support members.

2. A furniture assembly comprising:

an elongated rigid panel;

securing means at opposite ends of the panel, the securing means including a pair of parallel coplanar channels extending along two opposite ends of the panel, the channels in each pair being positioned one above the other on respective upper and lower surfaces along opposite ends of the panel;

pairs of elongated rods adapted to be received and rigidly supported in the respective channels at the opposite ends of the panel;

a plurality of support members spaced about the edges of and abutting the panel, in alignment with the ends of said elongated rods, the support members including pairs of parallel holes positioned one above the other at the upper ends of the members and adapted to receive the ends of respective rods; and means for releasably fastening the opposing ends of the rods to the respective support members to rigidly secure the panel between the rods and to the support members, the rods and channels coacting with the panel and support members to prevent rolling and rotation of the panel member with respect to the support members.

3. The furniture assembly of claim 1 or 2, wherein the rod ends have a diameter narrower than the diameter of the rod in the channel extending through the holes in the vertical support members and include threads;

the fastening means including a plurality of internally threaded rod caps engageable with the rod ends.

4. The furniture assembly of claim 3 wherein the notches at the ends of the channels and the notches in the vertical support members are of a depth to cause the edges of the panel to be flush with the outer surface of the support members.

5. The furniture assembly of claim 3 wherein the rigid panel forms a seat member and including a vertical slot in each pair of vertical support members;

a chair back member including a pair of vertical posts engageable in the vertical slots, the vertical posts including holes for receiving the rod ends, the rod caps engaging the rod ends and securing the vertical posts in the vertical slots to the vertical support members.

6. The furniture assembly of claim 2 wherein the panel extends generally horizontally and the support members are vertical;

the securing means including a pair of notches at respective ends of the channels;

each of the vertical support members including a matching notch in an inner surface at the upper ends adjacent the holes engageable with respective notches at the channel ends.

7. The furniture assembly of claim 6 whrein the rod ends have a narrow diameter extending through the holes in the vertical support members and include threads;

the fastening means including a plurality of internally threaded caps engageable with the rod ends.

8. The furniture assembly of claim 7 wherein the pairs of parallel coplanar channels are in the upper and lower surfaces adjacent the ends of the panel.

9. The furniture assembly of claim 7 wherein the rigid panel forms a table top member and including:

a second rigid panel forming a lower shelf member having a pair of parallel coplanar channels extending along two opposite ends of the lower shelf member and pairs of notches at the ends of the coplanar channels;

further pairs of elongated rods including narrow ends, said further pairs of elongated rods received in the pairs of channels in the second rigid panel, the support members incluidng:

further pairs of parallel holes at the lower ends of the support members to receive the respective ends of the further rods and further pairs of matching notches at the lower ends of the support members and further rod caps engageable with the ends of the further rods.

10. The furniture assembly of claim 9 wherein the table top assembly and the lower shelf assembly are stackable and positively alignable by rows of pins positioned into holes in the bottom surfaces of the support members of the table assembly and the upper surfaces of the support members of the lower shelf assembly.

11. The furniture assembly of claim 10 including a pair of rigid side panels, each side panel including;

a pair of upper and lower grooved inner lateral extensions engageable with respective pairs of the rods to secure the side panels between respective opposite ends of the table top and lower shelf members.

12. The furniture assembly of claim 10 including a pair of rigid side panels, each side panel including:

a pair of upper and lower grooves engageable with respective pairs of the rods to secure the side panel between respective opposite ends of the table top and lower shelf members; and sides engageable with the inner surfaces of the respective pairs of support members to secure the side panel between the support members.

13. The furniture assembly of claim 7 wherein the rigid panel forms a table top member and including:

a second rigid panel forming a lower shelf member having a pair of parallel coplanar channels extending along two opposite ends of the lower shelf member and pairs of notches at the ends of the coplanar channels;

further pairs of elongated rods, including narrow ends, said further pairs of elongated rods received in the pairs of channels in the second rigid panel, the support members including:

further vertical support members, in axial alignment with said vertical support members;

further pairs of parallel holes in the further support members to receive the respective ends of the further rods and further pairs of matching notches in the further support members and further rod caps engagable with the ends of the further rods.

14. The furniture assembly of claim 13 including a pair of front door panel members pivotably mounted at opposite, ends between the upper table top and lower shelf member form a cabinet enclosure.

15. The furniture assembly of claim 7 wherein the notches at the ends of the channels and the notches in the vertical support members are of a depth to cause the edges of the panel to be flush with the outer surfaces of the support members.

* * * * *